May 28, 1968     F. J. DOUGHERTY ET AL     3,385,193
EXPOSURE DEVICE FOR PHOTOSENSITIVE SURFACES
Filed Dec. 21, 1964     2 Sheets-Sheet 1

INVENTORS
FRANCIS J. DOUGHERTY &
WILLIAM A. STRAUSS, JR.
BY
ATTORNEYS

INVENTORS
FRANCIS J. DOUGHERTY &
WILLIAM A. STRAUSS, JR.

BY

ATTORNEYS

United States Patent Office 3,385,193
Patented May 28, 1968

3,385,193
EXPOSURE DEVICE FOR PHOTOSENSITIVE
SURFACES
Francis J. Dougherty, Palatine, Ill., and William A.
Strauss, Jr., Jarrettown, Pa., assignors to Chemical
Micro Milling Company, Philadelphia, Pa., a corporation of Delaware
Filed Dec. 21, 1964, Ser. No. 419,726
6 Claims. (Cl. 95—76)

ABSTRACT OF THE DISCLOSURE

A device for rotatably supporting photosensitive material on a light transmitting sheet to produce simultaneous exposures on opposite sides of the material. A flexible light transmitting cover member covers the material and means are provided to exhaust the air from between the cover and the sheet.

This invention relates to an exposure device for photosensitive surfaces, and more particularly, is useful for exposing opposed photosensitive surfaces simultaneously.

The device of this invention is of particular utility in the field of chemical modification of metals which is generally referred to as chemical milling. In chemical milling, it is frequently desired to chemically mill opposite faces of a metal sheet simultaneously. For example, a photosensitive resist such as a photosensitive gelatin will be applied to both faces of a metal sheet and then each side of the sheet is successively overlaid with a photographic negative carrying the desired design and exposed and then developed. It is the purpose of this invention to provide a structure which will support a metal plate and the overlying resist and the associated photographic negatives so that the opposite sides of the metal plate can be simultaneously exposed.

The invention and its objects will be clarified on reading the following description in conjunction with the drawings in which.

Figure 1:
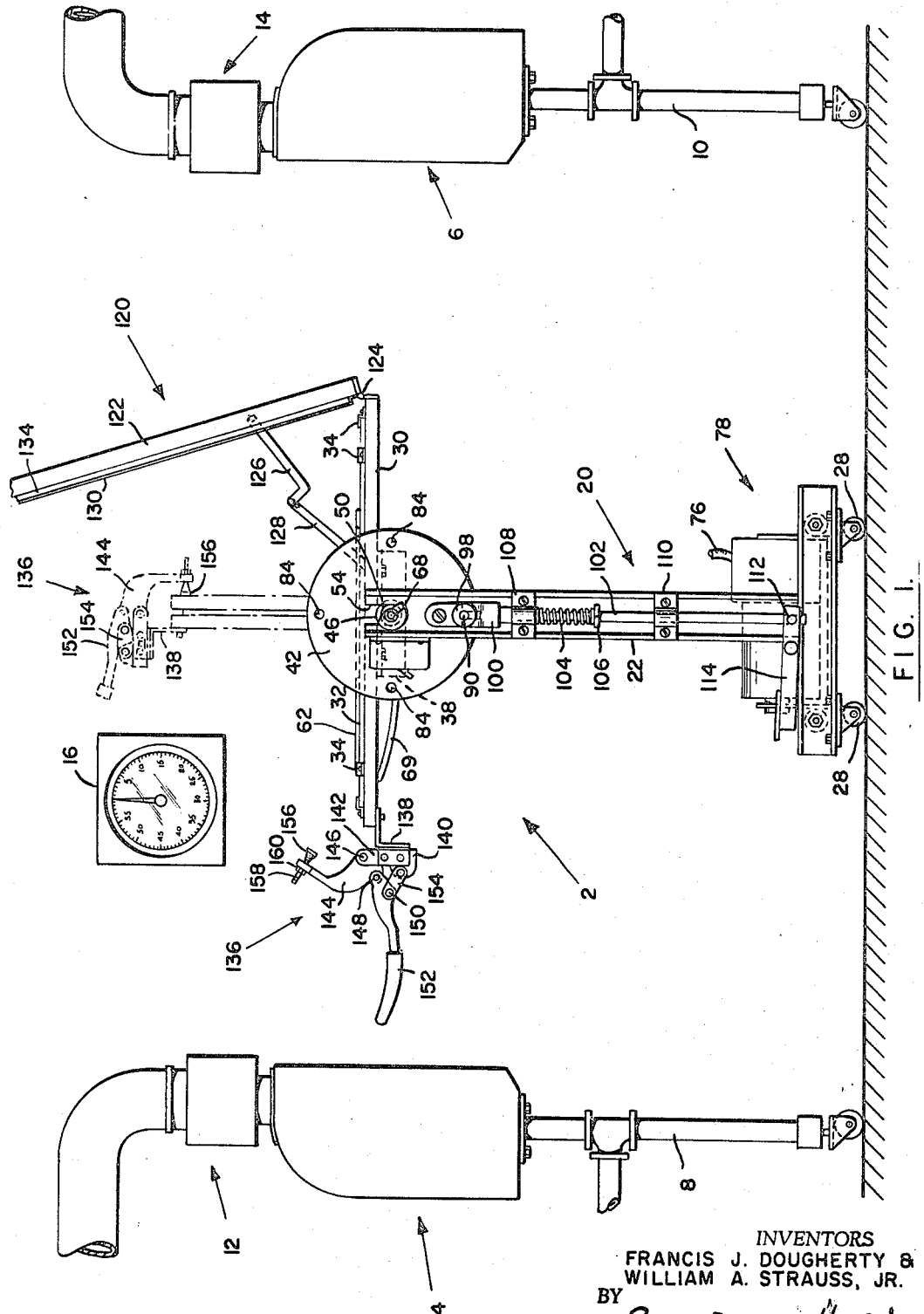
FIGURE 1 is a side elevation of a device in accordance with the invention and exposure lamp partially broken away.

Referring first to FIGURE 1, a device 2 in accordance with the invention is positioned between a carbon arc lamp 4 and a carbon arc lamp 6 respectively mounted on movable supports 8 and 10 and respectively connected to exhaust structures 12 and 14. A timer 16 is mounted adjacent device 2.

Device 2 has a support 20 including a pair of upright channel members 22 and 24 and wheels 28 for mobility. A frame 30, preferably of metal, carries the transparent or translucent sheet 32 preferably of relatively rigid material, such as glass. Sheet 32 is held in place by a series of clips 34 secured to frame 30, a piece of felt 36 being positioned between each clip 34 and glass 32.

A pair of right angle brackets 38 and 40 are secured to frame 30 (FIGURE 2) and are in turn respectively secured to circular plates 42 and 44, for example, by welding. Plates 42 and 44 are respectively secured to collars 46 and 48. Collars 46 and 48 respectively have peripheral grooves 50 and 52 which respectively engage U-shaped openings 54 and 56 in channel members 22 and 24. As will be readily apparent, this permits the rotation of frame 30 about the axis of collars 46 and 48 and yet permits the ready removal of frame 30 from support member 20.

A flexible hose 62 has openings 64 within the confines of frame 30. Hose 62 engages a male fitting portion 65 of a seal 66 which has a male fitting 67 connected to a flexible hose 69 which in turn is connected to a coupling 70 connected to a pipe 68 which fits tightly inside collar 46. A vacuum gauge 72 is connected to pipe 68 which in turn by a coupling indicated at 74 is connected to a flexible hose 76. Hose 76 is connected to a vacuum pump 78 mounted on support 20.

Plate 42 is provided with a plurality of openings 84 which are adapted to be engaged by a pin 90 which is biased towards the said openings by a compression coil spring 92 contained within a cap 94 secured to channel member 22, spring 92 engaging a collar 96 secured to pin 90. A cam member 98 fixedly secured to rod 102 which is biased downwardly by means of a compression coil spring 104 which engages a washer 106 fixedly secured to rod 102 and bearing member 108 secured to channel member 22. Rod 102 passes downwardly through bearing members 108 and 110 and is pivotally secured at 112 to a pedal 114.

A cover 120 has a frame 122 of, for example, wood, which is pivotally secured at 124 to frame 30. A pair of levers 126, 128 are respectively pivotally connected to frames 122 and 30 and to each other to serve in the conventional manner to hold cover 120 in the open position, as shown in FIGURE 1. A flexible, transparent or translucent sheet 130 is adhesively secured along its edges to frame 122 and passes over sealing frame 134 of, for example, wood, which is secured to frame 122. Frame 134 has openings 135 to accommodate clips 34.

Frames 122 and 30 are held together by a pair of clamping members 136, 136 each said member having a bracket 138 secured to frame 30 and carrying a block 140 to which, in turn, is secured support member 142. A lever 144 is pivotally secured at 146 to support member 142 and also is pivotally connected to bifurcated end 148 of a lever 152 which is pivotally secured at 150 to a lever 154 which is also pivotally secured to block 140. Each lever 144 carries a rubber member 156 secured to a threaded member 158 which passes through an opening in lever 144 and is secured thereto by a nut 160.

*Operation*

The use of the device 2 is commenced with the parts in the position shown in FIGURE 1 with the cover 120 being held in the open position by levers 126 and 128 and assembly 166 comprising a metal plate coated on both faces with a resist and having a photographic negative abutting each said face is positioned on sheet 32 with hose 62 positioned around assembly 166 and openings 64 facing the assembly. Cover 120 is then lowered and secured by means of clamping members 136, 136 which are actuated by moving lever 152 to pivot levers 144 and 154 clockwise as viewed in FIGURE 1 and bring the pivotal connection at 150 into line with the pivotal connections of lever 152 to lever 144 and lever 154 to block 140 into line in which position the clamping members will lock with rubber members 156 clamped against frame 122 as shown in phantom in FIGURE 1. At this stage, an air tight seal is formed by the urging of sheet 130 against frame 30 by means of sealing frame 134. Vacuum pump 78 is then started to evacuate air from between sheets 130 and 32, the air being withdrawn through openings 64 in tube 62, the diameter of which is less than the thickness of assembly 130. The thus created vacuum draws sheet 130 tightly against the assembly 166 to hold it firmly in the selected position.

Figure 2:
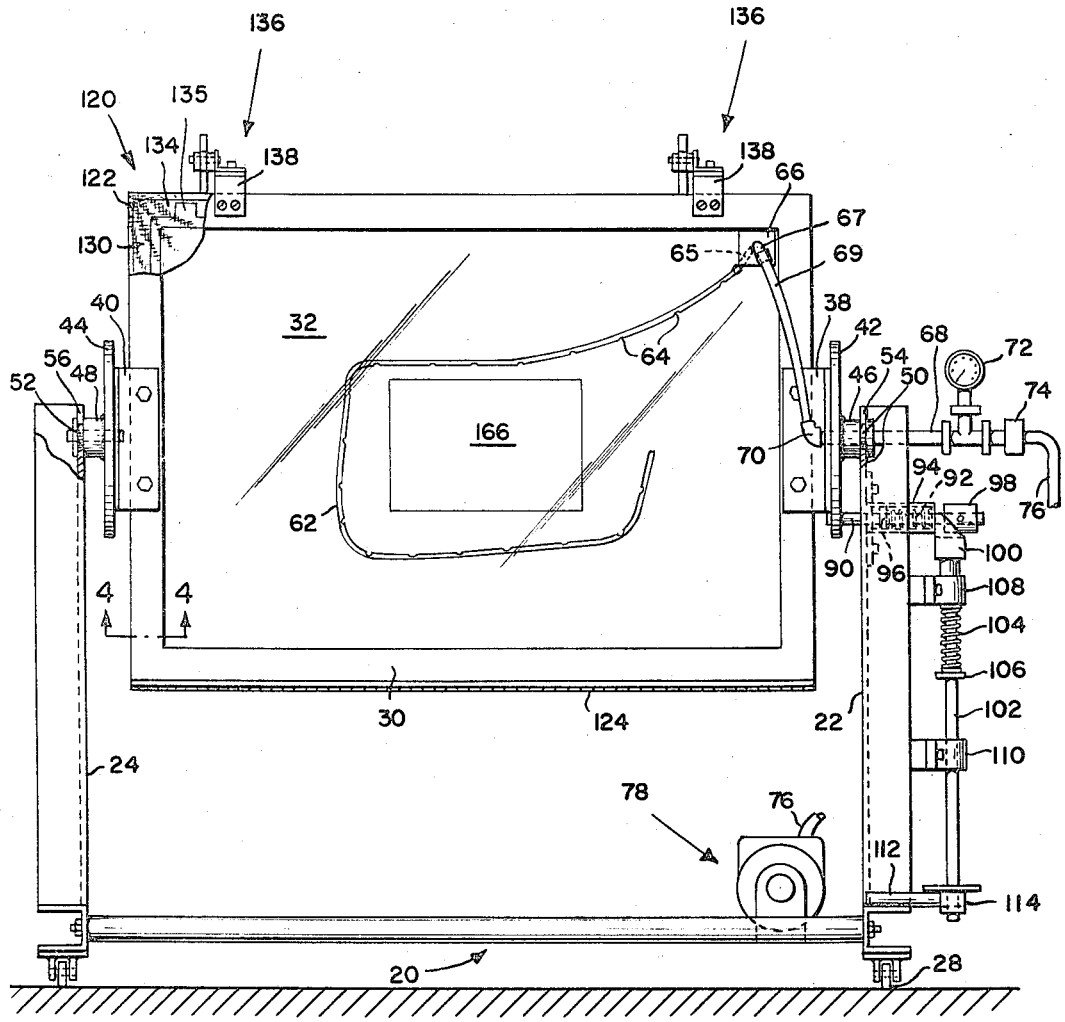
FIGURE 2 is a front elevation of the device of the invention shown in FIGURE 1.
Figure 3:
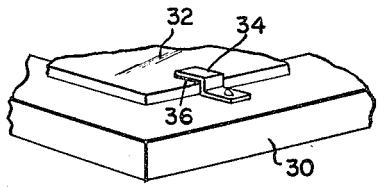
FIGURE 3 is a fragmentary view showing details of a clip employed in the device of FIGURE 1.
Figure 4:
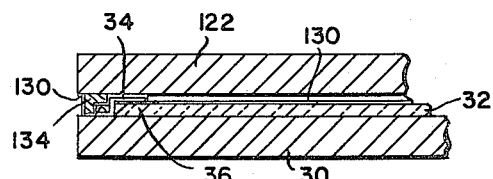
FIGURE 4 is a fragmentary view showing the details of the sealing arrangement employed in the device of FIGURE 1.

When the assembly 166 is being securely held by sheet 130, pedal 144 is foot actuated to elevate rod 102 and cause cam member 100 to cam cam member 98 to the right as viewed in FIGURE 2 and withdraw pin 90 from the opening 84 in which it is located (not shown). The frame 30 is then rotated 90° by hand to the position shown in phantom in FIGURE 1 where rod 102 is permitted to move downwardly under the force of spring 104 to permit spring 92 to urge pin 90 into the adjacent opening 84 to hold the frame 30 in a substantially vertical position. Arc lights 4 and 6 are then turned on for the desired time of exposure as timed by timer 16. When lights 4 and 6 are turned off, the reverse of the above described operation is carried out to remove the assembly 166.

It will be understood that the above specific description is by way of illustration only and it is not intended to be limiting.

What is claimed is:

1. A device for use in simultaneously exposing opposite photosensitive surfaces comprising:
    a light transmitting sheet,
    means to rotatably support said sheet on a substantially horizontal axis,
    a flexible light transmitting cover,
    means to seal the cover to the sheet, and
    means to exhaust air from between the cover and the sheet.

2. A device in accordance with claim 1 in which the means to exhaust air comprises a movable tube having openings spaced along its length and positioned between the sheet and the cover.

3. A device in accordance with claim 1 having means to secure the sheet in a vertical and a horizontal position.

4. A device for use in simultaneously exposing opposite photosensitive surfaces comprising:
    support means,
    a light transmitting sheet,
    a frame supporting said sheet, means to rotatably mount the frame on a substantially horizontal axis on the support means,
    a flexible light transmitting cover pivotally secured to the frame,
    means to seal the cover to the frame,
    means to exhaust air from between the sheet and the cover.

5. A device in accordance with claim 4 in which the means to exhaust air includes a movable tube having openings along its length and positioned between the sheet and the cover.

6. A device in accordance with claim 4 having means to secure the rotatable mounting means with the sheet substantially horizontal and with the sheet substantially vertical.

References Cited

UNITED STATES PATENTS

| 3,180,242 | 4/1965 | Wanielista et al. | 95—76 |
| 3,266,402 | 8/1966 | Benson | 95—76 |

NORTON ANSHER, *Primary Examiner.*

R. A. WINTERCORN, *Assistant Examiner.*